US009791744B2

(12) United States Patent
Tsai et al.

(10) Patent No.: US 9,791,744 B2
(45) Date of Patent: Oct. 17, 2017

(54) DISPLAY PANEL AND DISPLAY DEVICE

(71) Applicant: INNOLUX CORPORATION, Jhu-Nan, Miao-Li County (TW)

(72) Inventors: Tsung-Han Tsai, Jhu-Nan (TW); Chao-Hsiang Wang, Jhu-Nan (TW); An-Chang Wang, Jhu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 278 days.

(21) Appl. No.: 14/644,050

(22) Filed: Mar. 10, 2015

(65) Prior Publication Data

US 2016/0170272 A1 Jun. 16, 2016

(30) Foreign Application Priority Data

Dec. 12, 2014 (TW) .............................. 103143567 A

(51) Int. Cl.
*G02F 1/1343* (2006.01)
*G02F 1/1337* (2006.01)

(52) U.S. Cl.
CPC .. *G02F 1/133711* (2013.01); *G02F 1/133707* (2013.01)

(58) Field of Classification Search
CPC ........... G02F 1/134336; G02F 1/13439; G02F 1/133711; G02F 1/133707
See application file for complete search history.

(56) References Cited

U.S. PATENT DOCUMENTS

| 2012/0300148 | A1* | 11/2012 | Hong | ............... G09G 3/364 349/43 |
| 2015/0205172 | A1* | 7/2015 | Shin | ............... G02F 1/134363 349/143 |
| 2015/0212375 | A1* | 7/2015 | Park | ............... G02F 1/136209 349/46 |
| 2015/0277192 | A1* | 10/2015 | Park | ............... G02F 1/136286 349/43 |

FOREIGN PATENT DOCUMENTS

| JP | 2009151204 | 7/2009 |
| JP | 2013250331 | 12/2013 |
| KR | 20060118736 | 11/2006 |
| KR | 20060132164 | 12/2006 |
| KR | 20110069401 | 6/2011 |

* cited by examiner

*Primary Examiner* — Huyen Ngo
(74) *Attorney, Agent, or Firm* — Liu & Liu

(57) ABSTRACT

An electrode layer of a display panel includes a first trunk electrode extended along a first direction and a plurality of first and second branch electrodes disposed on two sides of the first trunk electrode. The first branch electrodes are separated by a distance (T). The first branch electrode has a first curved side, and the second branch electrode has a second curved side. The first curved side and second curved side have a first shortest distance (A) therebetween along a second direction. A first vertex is the highest point or lowest point of the first curved side along the first direction, and a second vertex is the highest point or lowest point of the second curved side along the first direction. The first vertex and second vertex have a second shortest distance (B) therebetween along the second direction. The equation of $0.5T \leq (B-A) \leq T$ is satisfied.

14 Claims, 5 Drawing Sheets

DISPLAY PANEL AND DISPLAY DEVICE

CROSS REFERENCE TO RELATED APPLICATIONS

This Non-provisional application claims priority under 35 U.S.C. §119(a) on Patent Application No(s). 103143567 filed in Taiwan, Republic of China on Dec. 12, 2014, the entire contents of which are hereby incorporated by reference.

BACKGROUND OF THE INVENTION

Field of Invention

The invention relates to a display panel and a display device and, in particular, to a flat display panel and a flat display device.

Related Art

With the progress of technologies, flat display devices have been widely applied to various kinds of fields. Especially, liquid crystal display (LCD) devices, having advantages such as compact structure, low power consumption, less weight and less radiation, gradually take the place of cathode ray tube (CRT) display devices, and are widely applied to various electronic products, such as mobile phones, portable multimedia devices, notebooks, LCD TVs and LCD screens.

In the multi-domain vertical alignment (MVA) process for enhancing the quality of the TFT LCD, the polymer sustained alignment (PSA) technology is a sufficiently mature technique to achieve the mass production and enhance the optical features such as aperture ratio and contrast. In the PSA technology, photosensitive monomers are mixed with the liquid crystal during the one drop filling (ODF) process, and then an ultraviolet exposure is executed while an electric field is applied, so that the photosensitive monomers within the liquid crystal are chemically reacted. Consequently, the reacted monomers are arranged according to the pattern of the transparent conductive layer of the TFT substrate so that the LC alignment can be achieved by the chemically reacted monomers.

In the conventional art, the transparent conductive layer of the TFT substrate generally includes the combination of trunk electrode and branch electrode. Besides, in the conventional design, since the branch electrode is obliquely connected to the trunk electrode, their connection (or called the turning portion) is generally designed as a sharp angle. In other words, the branch electrode and the trunk electrode have an included angle (such as 45° or 135°). However, because of the sharp angle of the turning portion, the LC molecules will be arranged abnormally due to the discontinuous electric field at the turning portion during the electric application step. Therefore, it is necessary to increase the curing time of the monomers to make the LC molecules at the turning portion stably pre-tilt at an angle. Accordingly, the process time will be increased and the product competitiveness will be thus reduced.

SUMMARY OF THE INVENTION

An objective of the invention is to provide a display panel and a display device whereby the abnormal LC arrangement resulted from the discontinuous electric field at the turning portion of the branch electrode of the electrode layer can be improved, and thus the process time can be reduced and the product competitiveness can be enhanced.

To achieve the above objective, a display panel according to this invention includes a first substrate, a second substrate disposed opposite the first substrate and an electrode layer. The electrode layer is disposed on the first substrate and faces the second substrate, and includes a first trunk electrode extended along a first direction and a plurality of first branch electrodes and a plurality of second branch electrodes disposed on two sides of the first trunk electrode. The first branch electrodes or the second branch electrodes are separated by a distance (T). One of the first branch electrodes has a first curved side which is adjacent to the first trunk electrode, and one of the second branch electrodes has a second curved side which is adjacent to the first trunk electrode. The first curved side and the second curved side have a first shortest distance (A) therebetween along a second direction that is perpendicular to the first direction. The first curved side has a first vertex, and the second curved side has a second vertex. The first vertex is the highest point or lowest point of the first curved side along the first direction, and the second vertex is the highest point or lowest point of the second curved side along the first direction. The first vertex and the second vertex have a second shortest distance (B) therebetween along the second direction. A, B, T satisfy the equation of $0.5T \leq (B-A) \leq T$, and the unit of A, B, T is micrometer.

To achieve the above objective, a display device according to this invention includes a display panel and a backlight module disposed opposite the display panel. The display panel includes a first substrate, a second substrate disposed opposite the first substrate and an electrode layer. The electrode layer is disposed on the first substrate and faces the second substrate, and includes a first trunk electrode extended along a first direction and a plurality of first branch electrodes and a plurality of second branch electrodes disposed on two sides of the first trunk electrode. The first branch electrodes or the second branch electrodes are separated by a distance (T). One of the first branch electrodes has a first curved side which is adjacent to the first trunk electrode, and one of the second branch electrodes has a second curved side which is adjacent to the first trunk electrode. The first curved side and the second curved side have a first shortest distance (A) therebetween along a second direction that is perpendicular to the first direction. The first curved side has a first vertex, and the second curved side has a second vertex. The first vertex is the highest point or lowest point of the first curved side along the first direction, and the second vertex is the highest point or lowest point of the second curved side along the first direction. The first vertex and the second vertex have a second shortest distance (B) therebetween along the second direction. A, B, T satisfy the equation of $0.5T \leq (B-A) \leq T$, and the unit of A, B, T is micrometer.

In one embodiment, A, B, T further satisfy the equation of $0.6T \leq (B-A) \leq 0.9T$.

In one embodiment, the interval between the two adjacent first branch electrodes along a third direction is the distance (T), the interval between the two adjacent second branch electrodes along a fourth direction is the distance (T), and the third direction is substantially perpendicular to the fourth direction.

In one embodiment, the first curved side and the second curved side are disposed oppositely.

In one embodiment, the first curved side and the second curved side are disposed in a staggered manner.

In one embodiment, the electrode layer further includes a second trunk crossing the first trunk electrode, and the included angle between the first trunk electrode and the second trunk electrode is between 80° and 100°.

In one embodiment, one of the first branch electrodes or one of the second branch electrodes further has a straight side, and the included angle between the extension of the straight side and the first trunk electrode or second trunk electrode is between 5° and 85°.

As mentioned above, in the display panel and display device of the invention, the electrode layer includes a first trunk electrode extended along the first direction and a plurality of first branch electrodes and a plurality of second branch electrodes disposed on the two sides of the first trunk electrode respectively, and the first branch electrodes or the second branch electrodes are separated by a distance T. Besides, the first curved side and the second curved side have a first shortest distance A therebetween along the second direction that is perpendicular to the first direction. Furthermore, the first vertex of the first curved side is the highest point or lowest point of the first curved side along the first direction, the second vertex of the second curved side is the highest point or lowest point of the second curved side along the first direction, and the first vertex and the second vertex have a second shortest distance B therebetween along the second direction. When A, B, T satisfy the equation of $0.5T \leq (B-A) \leq T$, the abnormal LC arrangement resulted from the discontinuous electric field at the turning portion of the branch electrode of the electrode layer can be improved, and thus the process time be reduced and the product competitiveness can be enhanced, in comparison with the conventional art.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
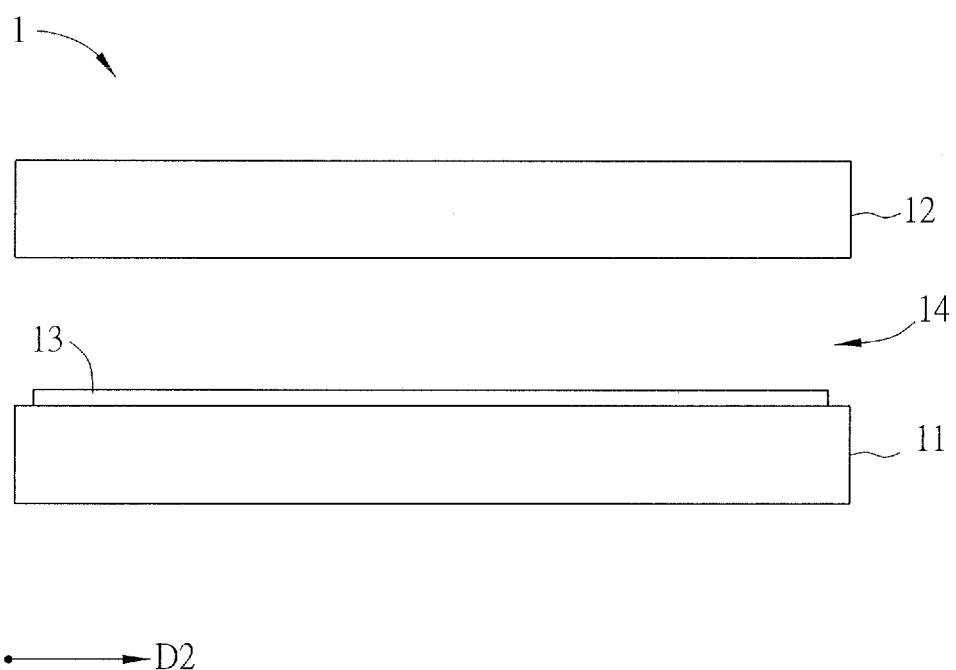
FIG. 1 is a schematic diagram of a display panel of an embodiment of the invention.
Figure 2A:
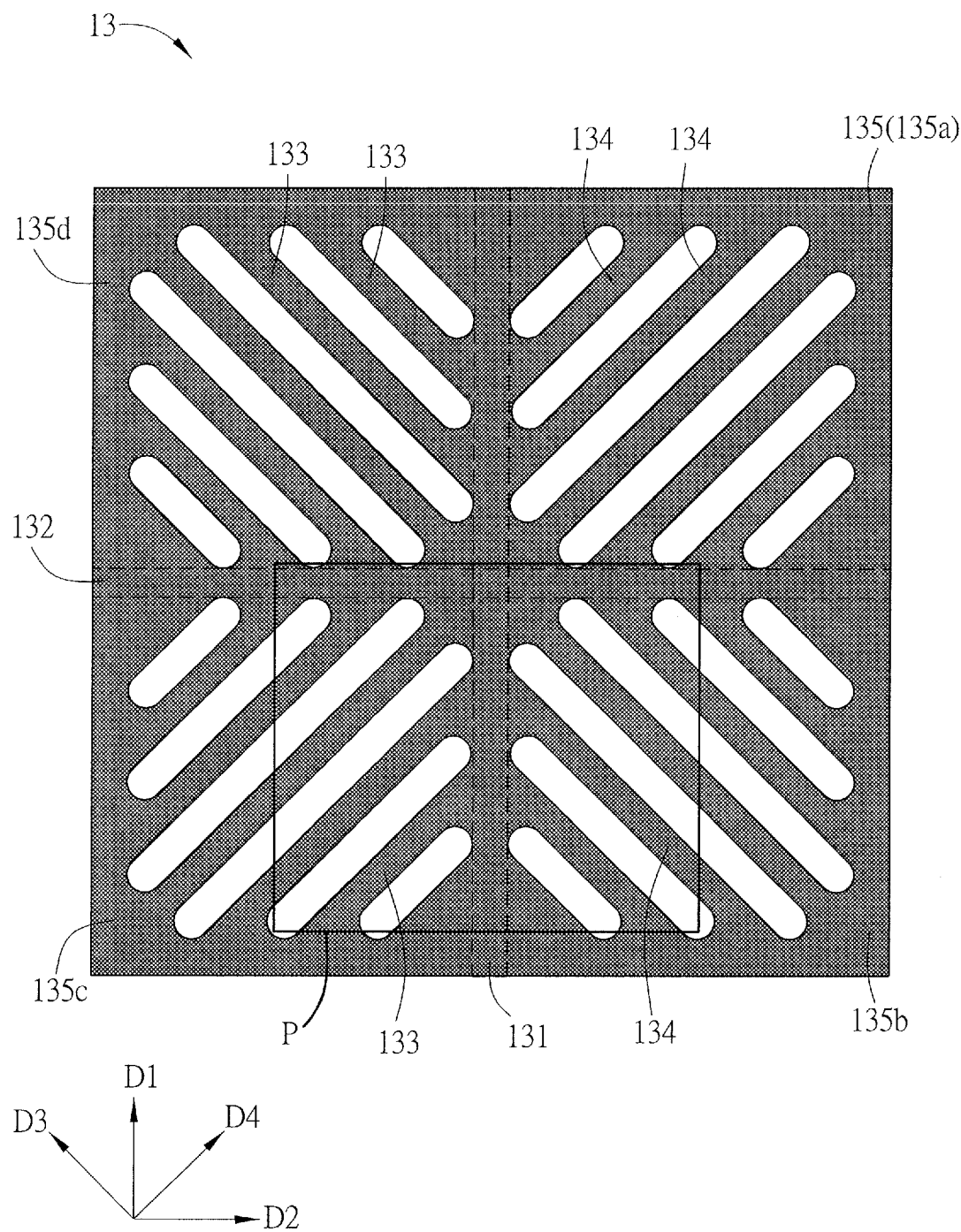
FIG. 2A is a schematic diagram of the electrode pattern of the electrode layer of the display panel in FIG. 1.
Figure 2B:
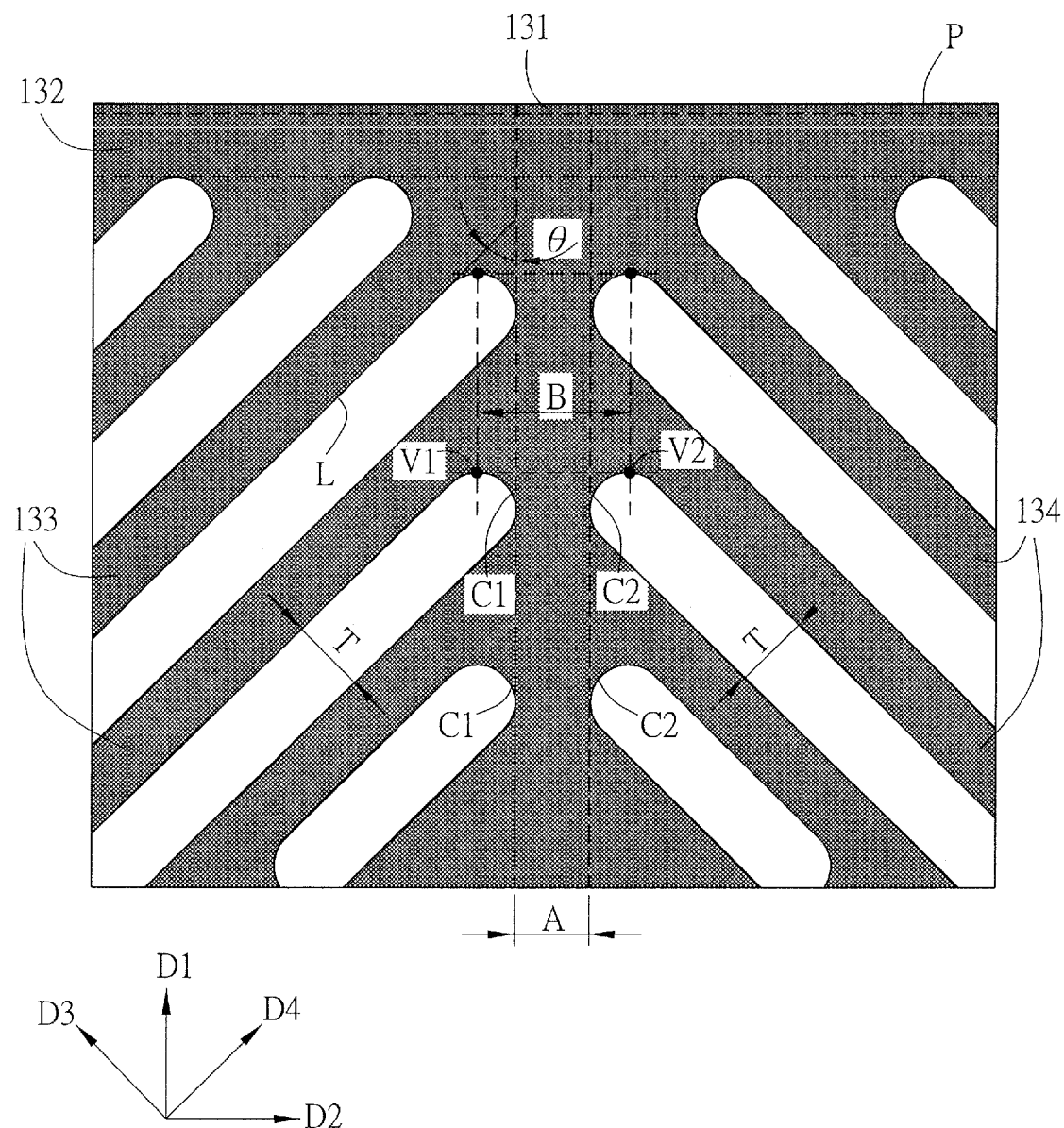
FIG. 2B is a schematic enlarged diagram of a region in FIG. 2A.

FIG. 1 is a schematic diagram of a display panel 1 of an embodiment of the invention, FIG. 2A is a schematic diagram of the electrode pattern of the electrode layer 13 of the display panel 1 in FIG. 1, and FIG. 2B is a schematic enlarged diagram of the region P in FIG. 2A.

The display panel 1 of this embodiment is, for example but not limited to, an IPS (in-plane switch) LCD panel, an FFS (fringe field switching) LCD panel, a VA (vertical alignment) mode LCD panel or a 3D LCD panel.

As shown in FIG. 1, the display panel 1 includes a first substrate 11, a second substrate 12 and an electrode layer 13.

The display panel 1 can further include a liquid crystal layer 14 (the LC molecules are not shown). The display panel 1 can be applied to the smart phone, tablet computer or other electronic devices. When the light passes through the display panel 1, the pixels (or sub-pixels) of the display panel 1 can display colors to form images.

The first substrate 11 is disposed opposite the second substrate 12, and the liquid crystal layer 14 is disposed between the first substrate 11 and the second substrate 12. Each of the first substrate 11 and second substrate 12 can be made by transparent material, and can be a glass substrate, a quartz substrate or a plastic substrate for example.

The electrode layer 13 is disposed on the first substrate 11 and faces the second substrate 12. The electrode layer 13 is a transparent conductive layer and can be made by indium-tin oxide (ITO) or indium-zinc oxide (IZO), but this invention is not limited thereto. In this embodiment, the electrode layer 13 is the pixel electrode layer of the display panel 1 and electrically connected with the data lines (not shown). Herein, FIG. 2A just shows a part of the electrode layer 13 in FIG. 1, and the shown portion is the pattern of the pixel electrode of one sub-pixel of the display panel 1.

The display panel 1 can further include a thin film transistor (TFT) array, a color filter (CF) array and a black matrix layer (not shown). The TFT array is disposed on the first substrate 11, and the CF array or the black matrix layer can be disposed on the first substrate 11 or the second substrate 12. The TFT array, the CF array and the liquid crystal layer 14 can form a pixel array. In one embodiment, the black matrix layer and the CF array can be disposed on the second substrate 12. However, in other embodiments, the black matrix layer or the CF array can be disposed on the first substrate 11 to make a BOA (BM on array) substrate or a COA (color filter on array) substrate. However, this invention is not limited thereto. Moreover, the display device 1 can further include a plurality of scan lines and a plurality of data lines (not shown), both of which cross each other, perpendicularly for example, to define the area of the pixel array. The pixel array includes a plurality of pixels (or sub-pixels) which are arranged into a matrix pattern.

As shown in FIGS. 2A and 2B, the electrode layer 13 includes a first trunk electrode 131, a second trunk electrode 132 and a plurality of first branch electrodes 133 and a plurality of second branch electrodes 134. The first branch electrodes 133 and the second branch electrodes 134 are disposed on the two sides of the first trunk electrode 131, respectively. The first trunk electrode 131 is extended along the first direction D1, the second trunk electrode 132 is extended along a second direction D2, and the first direction D1 is substantially perpendicular to the second direction D2. In this embodiment, the first direction D1 is the upward and downward direction in FIG. 2A, and the second direction D2 is the leftward and rightward direction in FIG. 2A. However, in other embodiments, the first direction D1 may be the leftward and rightward direction in FIG. 2A, and the second direction D2 may be the upward and downward direction in FIG. 2A.

The first trunk electrode 131 and the second trunk electrode 132 cross each other, and the included angle therebetween can be between 80° and 100°. Herein for example, the connection of the first trunk electrode 131 and second trunk electrode 132 is located at the central region of the electrode layer 13, and the included angle therebetween is substantially 90° (i.e. the first direction D1 is substantially perpendicular to the second direction D2). Since the first trunk electrode 131 and the second trunk electrode 132 cross each other and their connection is located at the central region, the electrode layer 13 can be divided into four domains by the first trunk electrode 131 and the second trunk electrode 132. Furthermore, a surrounding electrode 135 is disposed around the electrode layer 13. The surrounding electrode 135 includes four surrounding portions 135a, 135b, 135c, 135d. The surrounding portions 135a, 135b are connected with the first trunk electrode 131, the second trunk electrode 132 and the second branch electrodes 134, and the surrounding portions 135c, 135d are connected with the first trunk electrode 131, the second trunk electrode 132 and the first branch electrodes 133, so as to form a closed-type electrode layer 13.

As shown in FIG. 2B, the first branch electrodes 133 or the second branch electrodes 134 are separated by a distance T. Herein for example, the interval between the two adjacent first branch electrodes 133 along a third direction D3 is the distance T, and the interval between the two adjacent second branch electrodes 134 along a fourth direction D4 is also the distance T. The third direction D3 is substantially perpendicular to the fourth direction D4. The first branch electrodes 133 are connected with the first trunk electrode 131 or the second trunk electrode 132, and the second branch electrodes 134 are connected with the first trunk electrode 131 or the second trunk electrode 132. Herein for example, a part of the first branch electrodes 133 is connected with the first trunk electrode 131, a part of the first branch electrodes 133 is connected with the second trunk electrode 132, a part of the second branch electrodes 134 is connected with the first trunk electrode 131, and a part of the second branch electrodes 134 is connected with the second trunk electrode 132.

One of the first branch electrodes 133 has a first curved side C1 which is adjacent to the first trunk electrode 131, and one of the second branch electrodes 134 has a second curved side C2 which is adjacent to the first trunk electrode 131. Herein for example, the first branch electrodes 133 all have a first curved side C1 which is adjacent to the first trunk electrode 131, and the second branch electrodes 134 all have a second curved side C2 which is adjacent to the first trunk electrode 131. The first curved side C1 and the second curved side C2 are disposed oppositely. However, in other embodiments, the first curved side C1 and the second curved side C2 may be disposed in a staggered manner along the first direction D1 (i.e. not disposed oppositely) for example. In addition to the first curved side C1 and the second curved side C2, the first branch electrode 133 and the second branch electrode 134 can both further have at least a straight side L, and the included angle θ between the extension of the straight side L and the first trunk electrode 131 or second trunk electrode 132 can be between 5° and 85°. Herein for example, the included angle θ between the extension of the straight side L of the first branch electrode 133 (and the second branch electrode 134) and the first trunk electrode 131 is between 5° and 85°.

Moreover, the first curved side C1 and the second curved side C2 have a first shortest distance A therebetween along the second direction D2. In this embodiment, as shown in FIG. 2B, since the first curved side C1 and the second curved side C2 are disposed oppositely, the shortest distance therebetween along the second direction D2 is defined as A. However, in other embodiments where the first curved side C1 and the second curved side C2 are staggered (but the rest condition is the same), since the above distance is limited to along the second direction D2, the first shortest distance A between the first curved side C1 and the second curved side C2 along the second direction D2 will still be the same as the case of FIG. 2B where the first curved side C1 and the second curved side C2 are disposed oppositely. Additionally, in other embodiments, the first shortest distance A can be defined as below. The first shortest distance A can be the width of the first trunk electrode 131 along the second direction D2. Or, the two adjacent first branch electrodes 133 have a first interval and the two adjacent second branch electrodes 134 have a second interval, and the first shortest distance A is the shortest distance from the first interval to the second interval along the second direction D2. However, this invention is not limited thereto.

Moreover, the first curved side C1 has a first vertex V1, and the second curved side C2 has a second vertex V2. The first vertex V1 is the highest point or lowest point of the first curved side C1 along the first direction D1, and the second vertex V2 is the highest point or lowest point of the second curved side C2 along the first direction D1. The first vertex V1 and the second vertex V2 have a second shortest distance B therebetween along the second direction D2. Herein for example, the first vertex V1 is the highest point of the first curved side C1 along the first direction D1, and the second vertex V2 is also the highest point of the second curved side C2 along the first direction D1. To be noted, the first direction D1 in this embodiment is the vertical direction in FIG. 2B. However, in another embodiment where the first direction D1 is the horizontal direction, the first vertex V1 also can be regarded as the highest point or lowest point of the first curved side C1 along the first direction D1 and the second vertex V2 also can be regarded as the highest point or lowest point of the second curved side C2 along the first direction D1, just by rotating the viewing angle of the electrode layer 13 for 90°.

Through the actual experimental data, it can be found that in the conventional art where the turning portion of the connection of the branch electrode and trunk electrode is designed as a sharp angle (i.e. (B−A)=0), the transmittance of the display panel 1 is higher but the abnormal arrangement of the LC molecules is more. However, if the turning portion is designed as a curved side, the value of (B−A)/T will rise and the abnormal arrangement of the LC molecules can be thus improved. But, when the value of (B−A)/T rises to 1 or over 1, the transmittance has an obvious descending tendency although the abnormal arrangement of the LC molecules can be further improved. Therefore, through adjusting the ratio of A to B (i.e. different designs of the curved side), the transmittance and the abnormal arrangement of the LC molecules can collectively have an optimum effect.

Accordingly, in the display panel 1 of this embodiment, the first shortest A, the second shortest distance B and the distance T between the first branch electrodes 133 (or the second branch electrodes 134) satisfy the equation of $0.5T \leq (B-A) \leq T$, wherein the unit of A, B, T is micrometer. Thereby, the transmittance and the abnormal arrangement of the LC molecules can collectively have a better effect. Therefore, the abnormal arrangement of the LC molecules resulted from the discontinuous electric field at the turning portion of the branch electrode and trunk electrode in the convention art can be improved, and thus the chemical reaction time of the monomers can be reduced and the product competitiveness can be enhanced. Furthermore, the effectiveness brought by the above improvement is more obvious with the higher ppi. Favorably, a much better effectiveness can be obtained when A, B, T satisfy the equation of $0.6T \leq (B-A) \leq 0.9T$.

Figure 3:
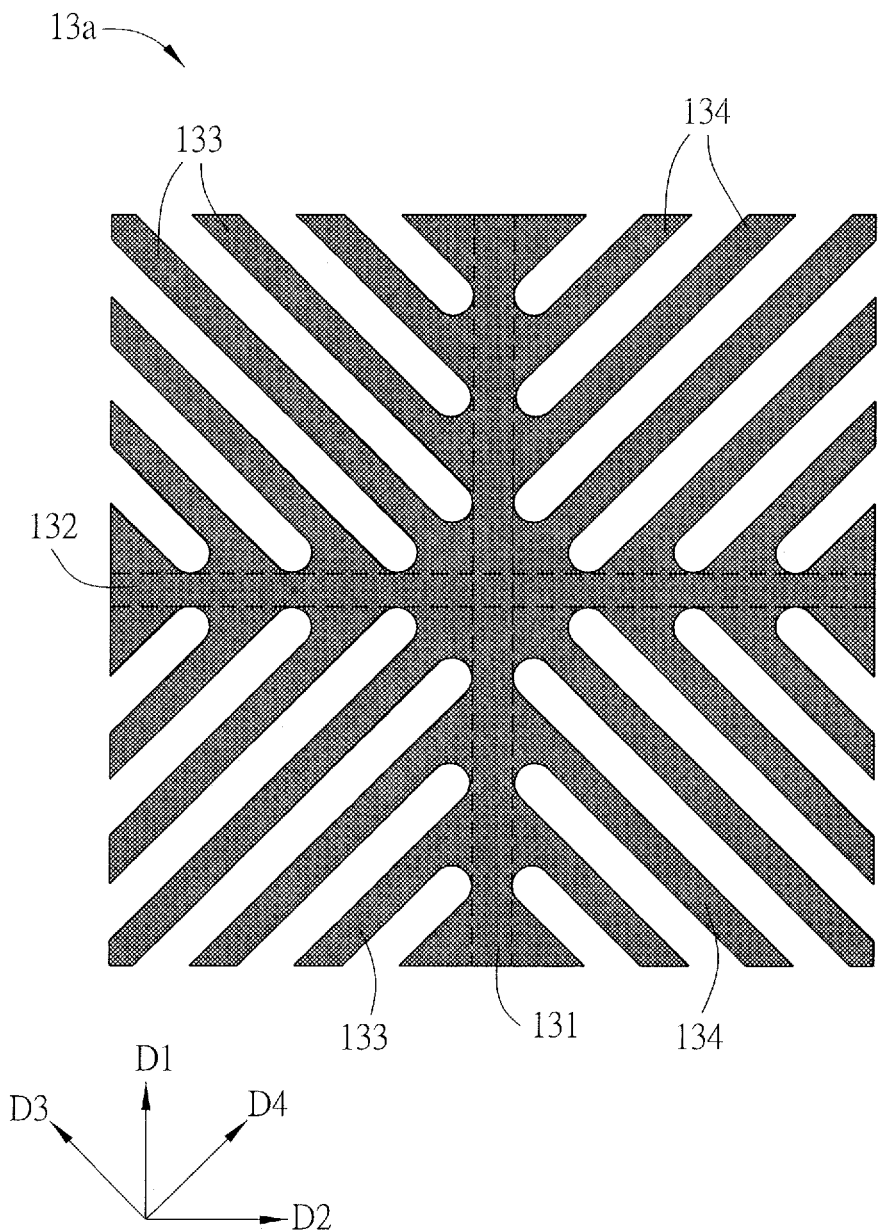
FIG. 3 is a schematic diagram of the electrode pattern of the electrode layer of another embodiment of the invention.

FIG. 3 is a schematic diagram of the electrode pattern of the electrode layer 13a of another embodiment of the invention.

As shown in FIG. 3, the main difference between the electrode layer 13a and the electrode layer 13 in FIG. 2A is that the electrode layer 13a is without the surrounding electrode 135 of the electrode layer 13, and therefore the electrode layer 13a is an open-type electrode layer.

Other technical features of the electrode layer 13a can be comprehended by referring to the above-mentioned electrode layer 13, and therefore the related illustration is omitted here for conciseness.

Figure 4:
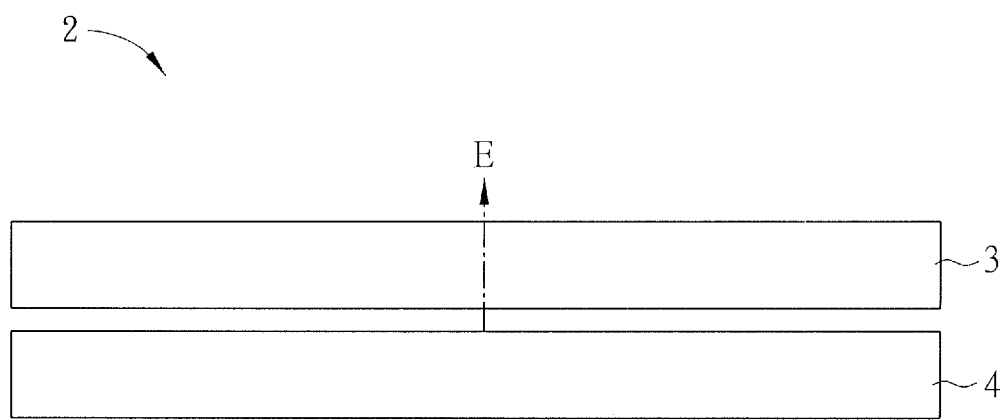
FIG. 4 is a schematic diagram of a display device of an embodiment of the invention.

FIG. 4 is a schematic diagram of a display device 2 of an embodiment of the invention.

As shown in FIG. 4, the display device 2 includes a display panel 3 and a backlight module 4 disposed opposite the display panel 3. The display panel 3 can have the all features of the above-mentioned display panel 1 with its variations, so the related illustration is omitted here for conciseness. When the backlight module 4 emits the light E passing through the display panel 3, the pixels (or sub-pixels) of the display panel 3 can display colors to form images accordingly.

Summarily, in the display panel and display device of the invention, the electrode layer includes a first trunk electrode extended along the first direction and a plurality of first branch electrodes and a plurality of second branch electrodes disposed on the two sides of the first trunk electrode respectively, and the first branch electrodes or the second branch electrodes are separated by a distance T. Besides, the first curved side and the second curved side have a first shortest distance A therebetween along the second direction that is perpendicular to the first direction. Furthermore, the first vertex of the first curved side is the highest point or lowest point of the first curved side along the first direction, the second vertex of the second curved side is the highest point or lowest point of the second curved side along the first direction, and the first vertex and the second vertex have a second shortest distance B therebetween along the second direction. When A, B, T satisfy the equation of $0.5T \leq (B-A) \leq T$, the abnormal LC arrangement resulted from the discontinuous electric field at the turning portion of the branch electrode of the electrode layer can be improved, and thus the process time be reduced and the product competitiveness can be enhanced, in comparison with the conventional art.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A display panel, comprising:
a first substrate and a second substrate disposed opposite the first substrate; and
an electrode layer disposed on the first substrate and facing the second substrate, and including a first trunk electrode extended along a first direction and a plurality of first branch electrodes and a plurality of second branch electrodes disposed on two sides of the first trunk electrode, wherein the first branch electrodes or the second branch electrodes are separated by a distance (T), one of the first branch electrodes has a first curved side which is adjacent to the first trunk electrode, one of the second branch electrodes has a second curved side which is adjacent to the first trunk electrode, the first curved side and the second curved side have a first shortest distance (A) therebetween along a second direction that is perpendicular to the first direction, the first curved side has a first vertex, the second curved side has a second vertex, the first vertex is the highest point or lowest point of the first curved side along the first direction, the second vertex is the highest point or lowest point of the second curved side along the first direction, and the first vertex and the second vertex have a second shortest distance (B) therebetween along the second direction, and A, B, T satisfy the equation of $0.5T \leq (B-A) \leq T$, the unit of A, B, T is micrometer.

2. The display panel as recited in claim 1, wherein A, B, T further satisfy the equation of $0.6T \leq (B-A) \leq 0.9T$.

3. The display panel as recited in claim 1, wherein the interval between the two adjacent first branch electrodes along a third direction is the distance (T), the interval between the two adjacent second branch electrodes along a fourth direction is the distance (T), and the third direction is substantially perpendicular to the fourth direction.

4. The display panel as recited in claim 1, wherein the first curved side and the second curved side are disposed oppositely.

5. The display panel as recited in claim 1, wherein the first curved side and the second curved side are disposed in a staggered manner.

6. The display panel as recited in claim 1, wherein the electrode layer further includes a second trunk electrode crossing the first trunk electrode, and the included angle between the first trunk electrode and the second trunk electrode is between 80° and 100°.

7. The display panel as recited in claim 6, wherein one of the first branch electrodes or one of the second branch electrodes further has a straight side, and the included angle between the extension of the straight side and the first trunk electrode or second trunk electrode is between 5° and 85°.

8. A display device, comprising:
a display panel including a first substrate, a second substrate disposed opposite the first substrate and an electrode layer, wherein the electrode layer is disposed on the first substrate and faces the second substrate, and includes a first trunk electrode extended along a first direction and a plurality of first branch electrodes and a plurality of second branch electrodes disposed on two sides of the first trunk electrode, the first branch electrodes or the second branch electrodes are separated by a distance (T), one of the first branch electrodes has a first curved side which is adjacent to the first trunk electrode, one of the second branch electrodes has a second curved side which is adjacent to the first trunk electrode, the first curved side and the second curved side have a first shortest distance (A) therebetween along a second direction that is perpendicular to the first direction, the first curved side has a first vertex, the second curved side has a second vertex, the first vertex is the highest point or lowest point of the first curved side along the first direction, the second vertex is the highest point or lowest point of the second curved side along the first direction, the first vertex and the second vertex have a second shortest distance (B) therebetween along the second direction, and A, B, T satisfy the equation of $0.5T \leq (B-A) \leq T$, the unit of A, B, T is micrometer; and
a backlight module disposed opposite the display panel.

9. The display device as recited in claim 8, wherein A, B, T further satisfy the equation of $0.6T \leq (B-A) \leq 0.9T$.

10. The display device as recited in claim 8, wherein the interval between the two adjacent first branch electrodes along a third direction is the distance (T), the interval between the two adjacent second branch electrodes along a fourth direction is the distance (T), and the third direction is substantially perpendicular to the fourth direction.

11. The display device as recited in claim 8, wherein the first curved side and the second curved side are disposed oppositely.

12. The display device as recited in claim 8, wherein the first curved side and the second curved side are disposed in a staggered manner.

13. The display device as recited in claim 8, wherein the electrode layer further includes a second trunk electrode crossing the first trunk electrode, and the included angle between the first trunk electrode and the second trunk electrode is between 80° and 100°.

14. The display device as recited in claim 13, wherein one of the first branch electrodes or one of the second branch electrodes further has a straight side, and the included angle between the extension of the straight side and the first trunk electrode or second trunk electrode is between 5° and 85°.

* * * * *